UNITED STATES PATENT OFFICE.

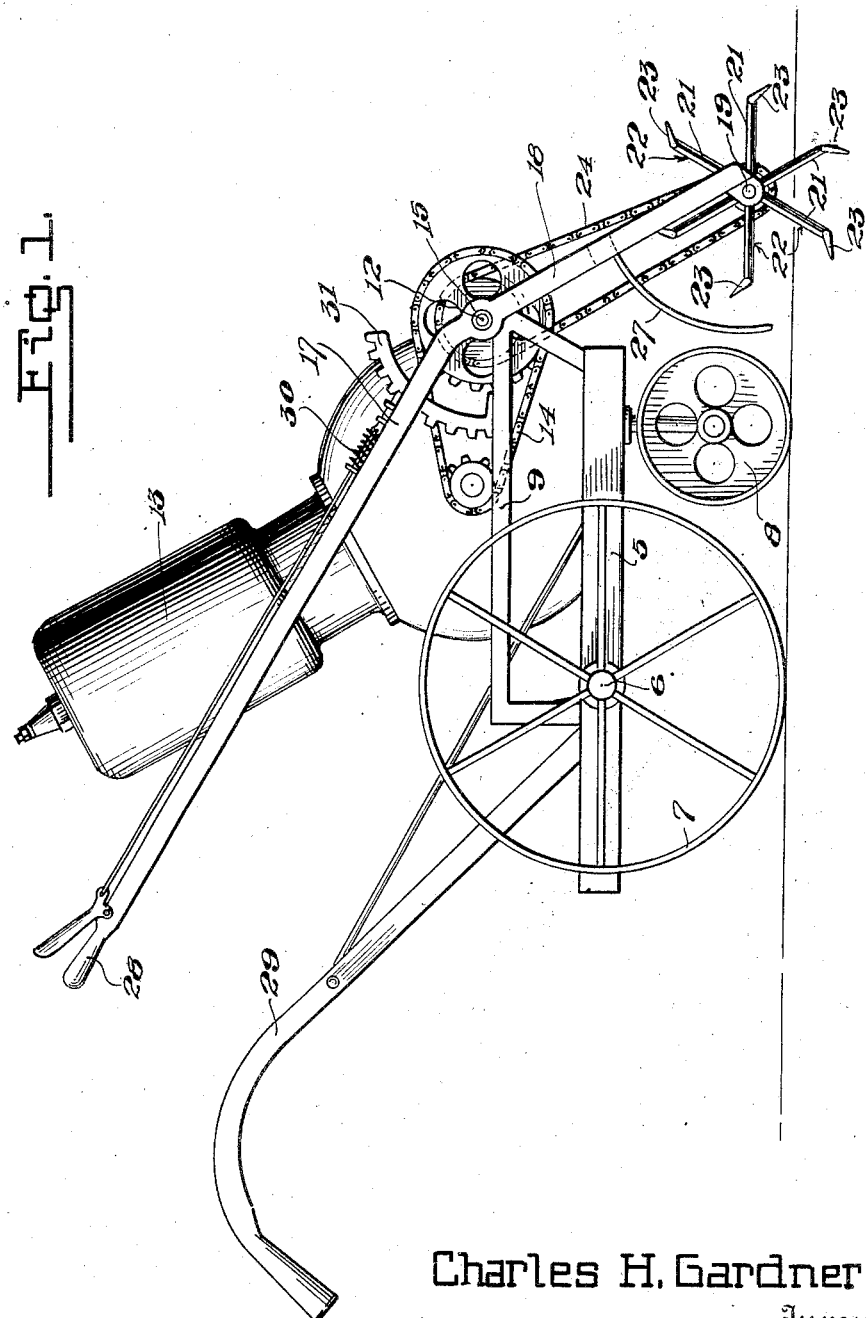

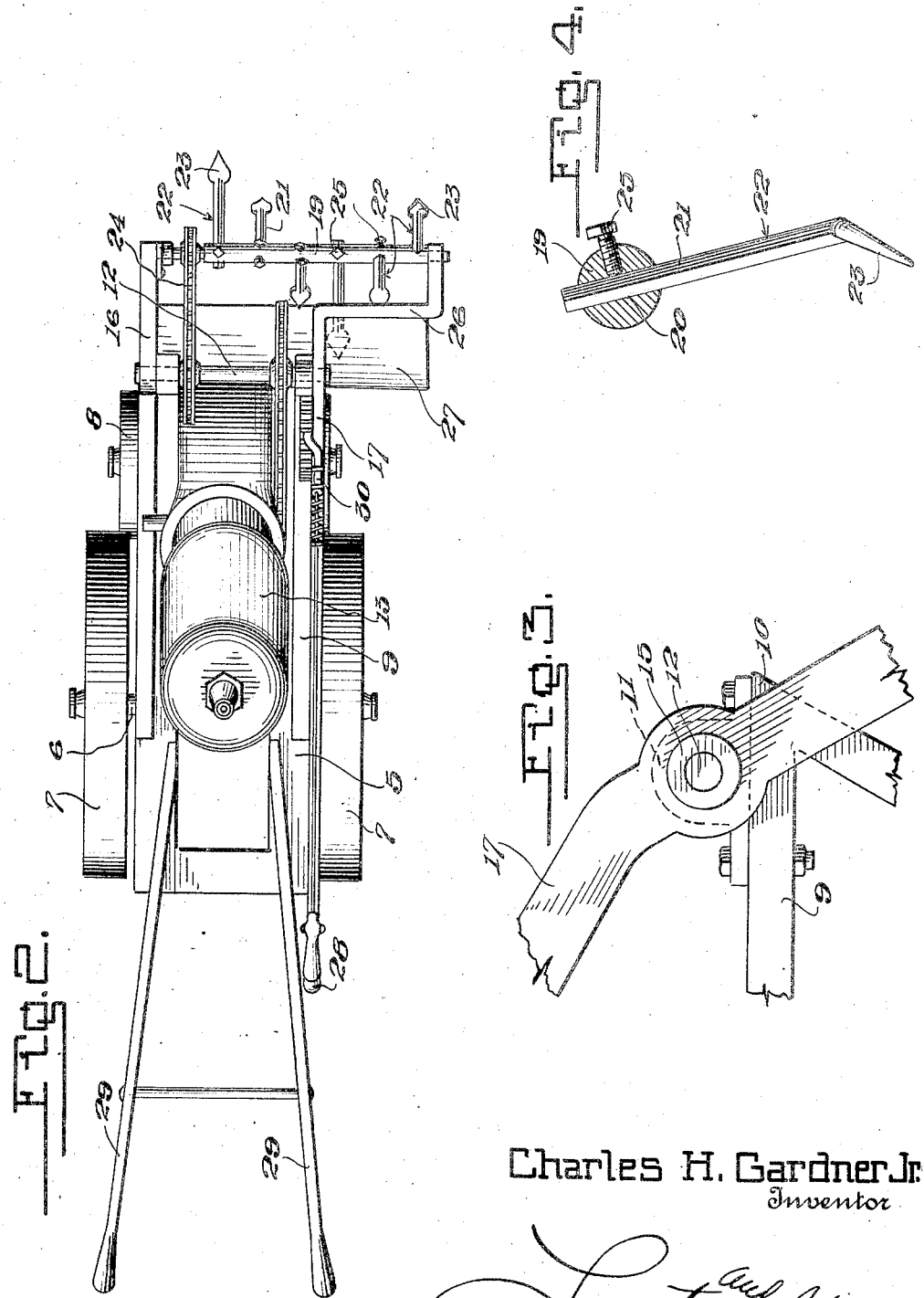

CHARLES H. GARDNER, JR., OF OAKLAND, CALIFORNIA.

AGRICULTURAL IMPLEMENT.

1,383,294.  Specification of Letters Patent.  Patented July 5, 1921.

Application filed November 20, 1919. Serial No. 339,339.

*To all whom it may concern:*

Be it known that I, CHARLES H. GARDNER, Jr., a citizen of the United States, residing at Oakland, in the county of Alameda and State of California, have invented certain new and useful Improvements in Agricultural Implements, of which the following is a specification.

This invention relates to agricultural implements, and more particularly to a power operated cultivator, weed exterminator and pulverizer which is adapted to be manually or mechanically forced over a field for preparing a seed bed or for exterminating weeds.

More specifically, the invention comprehends the provision of an agricultural implement as specified, which includes a shaft rotatably supported forwardly of the main supporting frame of the implement, and carried by a pair of pivotally mounted arms to one of which a hand lever is connected by means of which a shaft may be raised or lowered out of or into operative position relative to the surface over which it is traveling and which shaft carries a plurality of longitudinally spaced radially extending earth working teeth or tools adapted to tear up the surface over which the implement is traveling and throw the loosened earth against a suitable guard plate, which together with the action of the earth working teeth tends to thoroughly pulverize the ground and also to uproot and break up weeds or analogous growth which it is desired to exterminate.

Other objects of the invention will appear in the following detailed description taken in connection with the accompanying drawing, forming a part of this specification, and in which drawings:

Figure 1 is a side elevation of the improved agricultural implement.

Fig. 2 is a top plan of the agricultural implement.

Fig. 3 is a detailed enlarged side elevation of a part of the implement illustrating the manner of pivotally mounting the operating lever for moving the earth working tool into and out of operative position, and Fig. 4 is a section through the tool carrying shaft illustrating the manner of connecting the earth working teeth or tools thereto.

Referring more particularly to the drawings, wherein like characters indicate like and corresponding parts throughout the several views, the agricultural implement includes the supporting frame 5 which carries a rear axle 6 upon which the usual type of supporting wheels 7 are mounted. A pair of front supporting wheels 8 are supported beneath the forward end of the supporting frame 5 preferably in such manner as to permit them to pivot about vertical axes for facilitating the guiding of the implements.

The frame 5 has a super-supporting frame 9 attached thereto, the forward end of which inclines forwardly terminating in a pointed extension 10 at each side of the machine upon which bearings 11 are mounted. These bearings 11 rotatably support a shaft 12. The shaft 12 is operatively connected to the internal combustion engine or prime mover 13 by means of any suitable power transmitting mechanism, such as sprockets and a sprocket chain 14. Collars 15 are mounted on the shaft 12 at its end and an arm 16 is rockably supported by one of these collars extending forwardly and downwardly from the shaft 12, while a lever structure 17 is rockably supported by the collar at the opposite end of the shaft 12. This lever structure 17 includes a downward and forwardly extending arm 18 which extends parallel to the arm 16 and coacts therewith for supporting a shaft 19 at their lower ends and forwardly of the front end of the supporting frame 5 of the agricultural implement. The shaft 19 is provided with a plurality of longitudinally spaced openings 20 extending diametrically therethrough which receive the shanks 21 of the earth working teeth or tool structures 22. The shanks 21 of the tools 22 have flattened and sharpened heads or points 23 upon their ends remote from the shafts 19 which shafts are bent at an acute angle to the shanks 21 as clearly shown in Figs. 1 and 4 of the drawings, the teeth extending at such angles with respect to the axis of rotation of the shaft 19 as to cause them to gouge into the surface over which the implement is traveling for tearing it up or pulverizing it, and this shaft 19 is connected by means of a sprocket and chain mechanism 24 to the shaft 12 for rotating the shaft 19. The teeth 22 are held against relative movement to the shaft 19 by set screws 25, which extend through the shaft which bite against or engage against the shank 21 to securely hold them in place. As clearly shown in Fig. 2 of the drawings, the arm 18 is provided with a laterally offset portion 26, which permits the shaft 19 to project laterally in one direction of the frame 5, permitting the relatively wide earth working implements. The earth which is drawn up by the teeth 22 during the revolving of the shaft 19 is thrown against the forward concaved face of a shield 27, which is carried by the arms 16 and 18, and the force of impact of the dirt against this shield will tend to further pulverize the earth thereby permitting the forming of a relatively fine seed bed by means of the improved agricultural implement, or in case the implement is used for cultivating purposes, the force of impact upon the shield 27 and the action of the teeth 22 will tear up weeds and the like and break them up in such manner as to prevent them from taking root and growing after they have been once uprooted by the implement. The final steering off of the surface over which the implement moves further adapts it for efficient use in mixing soil, and for mixing various types of fertilizer with the soil so as to permit the obtaining of the best results from the use of the fertilizer. The lever 17 which projects rearwardly over the frame 9 and has its hand grip 28 positioned so that it can be conveniently reached by the operator of the device who pushes the implement over the ground through the medium of the handles 29 is provided, regulating the depth of digging, and for moving the teeth and tools 22 and shaft 19 out of operative relation with the ground over which the implement is traveling. A bolt mechanism 30 of any approved form is carried by the lever 17 and co-acts with a quadrant 31 for holding the lever in various adjusted positions.

Changes in details may be made without departing from the spirit of this invention, but;

I claim:

1. In a manually propelled agricultural implement, the combination of a supporting frame, a prime mover mounted upon said supporting frame, a tool carrying shaft, arms pivotally supporting said tool carrying shaft forwardly of said supporting frame, a shield connected to said arms and positioned rearwardly of said tool carrying shaft, and means for connecting said tool carrying shaft and prime mover whereby the tool carrying shaft is rotated and adapted to engage the ground in such manner as to throw clods and the like into forceful compact with the shield to pulverize the same.

2. In an agricultural implement, the combination of an operating shaft, a lever supported thereby, a forwardly and downwardly extending arm on said lever, a second forwardly and downwardly extending arm pivotally carried by said shaft, a tool carrying shaft supported by the lower ends of said arms, a plurality of radially extending earth working tools detachably carried by said tool carrying shaft, said lever adapted to be rocked upon said operating shaft as a fulcrum for varying the elevation of said earth working tools.

3. A manually propelled agricultural implement comprising in combination, a supporting frame, a prime mover mounted upon said supporting frame, an operating shaft carried by said supporting frame, and operatively connected to said prime mover, a tool carrying shaft, arms pivotally connecting said tool carrying shaft to said operating shaft, a lever rigidly connected to one of said arms to regulate the height of said tool carrying shaft with respect to the ground, and means connecting said tool carrying shaft and said operating shaft to rotate the tool carrying shaft.

4. In an agricultural implement, the combination of a supporting frame, an operating shaft carried thereby, a lever pivotally supported by the operating shaft, a forwardly and downwardly extending arm on said lever provided with a lateral extension intermediate its ends and positioning its lower forward terminal laterally of one side of said supporting frame, a second forwardly and downwardly extending arm pivotally carried by said shaft adjacent the side of said supporting frame opposite that from which said first named arm extends, a tool carrying shaft rotatably supported by the lower ends of the arms, and a plurality of radially extending earth working tools detachably carried by said tool carrying shaft.

5. In an agricultural implement, the combination of a supporting frame, an operating shaft carried thereby, a lever pivotally supported by the operating shaft, a forwardly and downwardly exteding arm on said lever provided with a lateral extension intermediate its ends and positioning its lower forward terminal laterally of one side of said supporting frame, a second forwardly and downwardly extending arm pivotally carried by said shaft adjacent the side of said supporting frame opposite that from which said first named arm extends, a tool carrying shaft rotatably supported by the lower ends of the arms, a plurality of radially extending earth working tools detachably carried by said tool carrying shaft, a guard shield carried by said arms rearwardly of said tool carrying shaft, said tools adapted to throw soil against said shield for breaking up clods, said lever adapted to be rocked upon said operating shaft as a fulcrum to vary the elevation of said tool carried shaft and the tools carried thereby, and means for holding said lever in adjusted position.

CHARLES H. GARDNER, Jr.